United States Patent [19]

Osterland et al.

[11] Patent Number: 4,630,338
[45] Date of Patent: Dec. 23, 1986

[54] MOLDING CLIP

[75] Inventors: Robert W. Osterland, Marine City; Nicholas M. Benedetti, Sterling Heights, both of Mich.

[73] Assignee: USM Corporation, Farmington, Conn.

[21] Appl. No.: 810,793

[22] Filed: Dec. 19, 1985

[51] Int. Cl.$^4$ ............................................. A44B 21/00
[52] U.S. Cl. ...................................... 24/293; 24/295; 52/718.1
[58] Field of Search ................. 24/293, 295, 289, 292, 24/294; 52/718.1

[56] References Cited

U.S. PATENT DOCUMENTS

| | | | |
|---|---|---|---|
| 2,537,662 | 1/1951 | Flora et al. | 24/293 |
| 2,644,607 | 7/1953 | Hinkel | 24/293 |
| 2,698,472 | 1/1955 | Knohl | 24/295 |
| 2,698,979 | 1/1955 | Flora | 24/293 |
| 2,863,195 | 12/1958 | Elms | 24/293 |
| 3,208,119 | 9/1965 | Seckerson | 24/295 |
| 3,310,929 | 3/1967 | Garvey | 24/295 |
| 4,175,303 | 11/1979 | Benedetti | 24/293 |

Primary Examiner—Victor N. Sakran
Attorney, Agent, or Firm—Aubrey C. Brine

[57] ABSTRACT

A one-piece resilient fastener or molding clip for retaining trim, molding or applique strips, parts, panels and other decorative items in bridging position over a gap between two spaced members is disclosed. Such a clip, which is particularly useful for attaching objects such as trim strips in automobile interiors, is attached through a suitably-shaped aperture in a base or support, particularly a plastic base panel, disposed in the gap, and has a pair of flexing wings or legs extending upwardly and outwardly from the end of the clip opposite the end to which the decorative item being retained is attached. These flexing wings or legs, designed to prevent them from passing completely through the base or support, permit variation take up between the decorative item being retained and the base or support as well as repeated assemblies and disassemblies of the clip to the base or support, with minimum insertion force and adequate removal effort, without destroying the clip or damaging the base or support.

7 Claims, 4 Drawing Figures

MOLDING CLIP

FIELD OF INVENTION

This invention relates to fasteners. More particularly, this invention relates to a one-piece resilient fastener or molding clip for attaching objects such as automobile trim to a base or support located in the interior of an automobile. This invention further relates to a one-piece resilient fastener or molding clip whose use enables variation take-up between a trim, molding or applique strip, part, panel or the like, borne by said fastener, and a base or support, particularly a plastic base panel having a square, rectangular or round opening formed therein, to which the fastener is attached, and also enables repeated assemblies and disassemblies of the molding-bearing fastener to the base or support, with minimum insertion force and adequate removal effort, without destroying the fastener or damaging the base or support.

BACKGROUND OF THE INVENTION

Molding clips have become important articles of commerce, particularly in the automotive industry. For example, when assembling automotive interiors, elongated trim strips, generally formed of chrome-plated sheet metal or like materials, are often used to cover the gap between the interior of the windshield, backlight or a fixed window and the adjacent body structure, or to bridge the roof side rail and headliner, or to bridge gaps between other spaced members, thus providing a more pleasing appearance to the automobile's interior.

Such elongated trim strips had long been fastened with sheet metal screws which were passed through holes in the strip and received in a suitable support, such as a based panel disposed in the gap between a window retaining structure and the body structure of the automobile. Fastening trim strips with sheet metal screws, however, can give rise to problems.

It is sometimes necessary to remove an already fastened strip. If the strip had been fastened with screws, reaffixing it can lead to misalignment, to distortion of the slots and heads of the originally-used screws (and consequently to the need to discard and replace the screws) and to damage to the mating holes in the base panel. Perhaps an even more serious problem is the possible distortion and inevitable loss of smooth surface appearance in the trim strip caused by inserting screws through the strip and setting them from above the strip's smooth upper surface.

A solution to many of these problems was provided by molding clips such as those disclosed in U.S. Pat. No. 4,175,303, issued Nov. 27, 1979, to Nicholas M. Benedetti; one of the present inventors, and assigned to USM Corporation ("the '303 patent"). Such molding clips can be used instead of machine screws to fasten trim, molding or applique strips, parts, panels and the like to a base or support, particularly a plastic base panel, in an automobile interior, and facilitate assembly of such decorative items while retaining these items' smooth surface appearance and minimizing distortion.

BRIEF DESCRIPTION OF THE INVENTION

The present invention provides novel molding clips having important features not found in the clips disclosed in the '303 patent. These novel clips, like those shown in the '303 patent, one-piece clips for retaining trim, molding or applique strips, parts, panels and the like in bridging position over a gap between two spaced members, wherein the clip is attached to a base or support, particularly a plastic base panel, disposed in the gap. Unlike the clips disclosed in the '303 patent, however, the novel molding clips which embody the present invention have a pair of flexing wings or legs, preferably of equal length, extending upwardly and outwardly from the end of the clip opposite the end to which the decorative item being retained is attached, towards the portion of the clip to which the decorative item is attached. These flexing wings or legs, which are desinged to prevent them from passing completely through the base or support which receives the clip, permit variation take up between the decorative item being retained and the base or support. They also permit repeated assemblies and disassemblies of the clip to the base or support, with minimum insertion force and adequate removal effort, without destroying the clip or damaging the base or support. The clip, further, is capable of assembly to a base or support having either a square, rectangular or round opening formed therein.

DESCRIPTION OF THE PREFERRED EMBODIMENT

Figure 1:
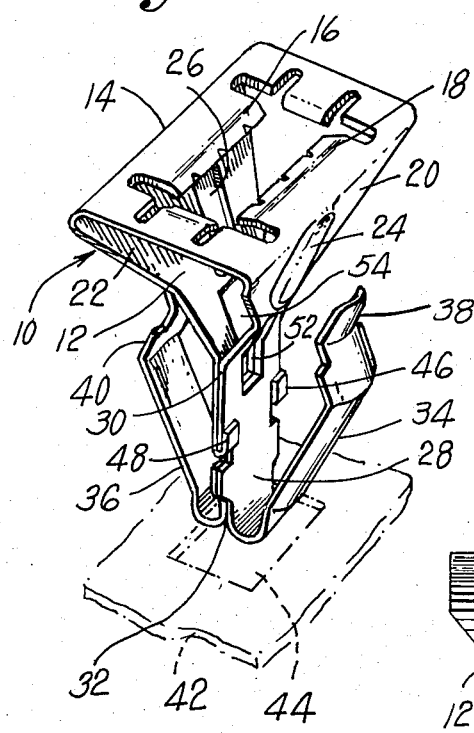
FIG. 1 is a front perspective view showing a molding clip constructed in accordance with the present invention, taken on enlarged scale to better reveal the details thereof, and, in phantom a portion of a base or support into which said clip is received.

Referring now to the drawings, and in particular to FIG. 1, there is shown a one-piece resilient fastener or molding clip 10, preferably fabricated from spring steel or any other suitable resilient material. The molding clip 10 comprises an upper body portion 12 having a planar top 14, which may take any form suitable for a particular application but is preferably square or rectangular in shape, containing means (in this illustration a pair of toothed tabs 16 and 18 facing one another across a gap in the top 14) adapted to engage and retain the underside of a trim strip or other decorative item (now shown in FIG. 1; shown in phantom at 50 in FIG. 4). Connected to the top 14 as continuations thereof is a pair of downwardly and inwardly sloping sides 20 and 22 which, together with the top 14, give the upper body portion 12 a triangular cross-section when viewed in side elevation (see also FIG. 4). A pair of bosses 24 and 26 (optional) add strength to the upper body portion 12.

Figure 3:
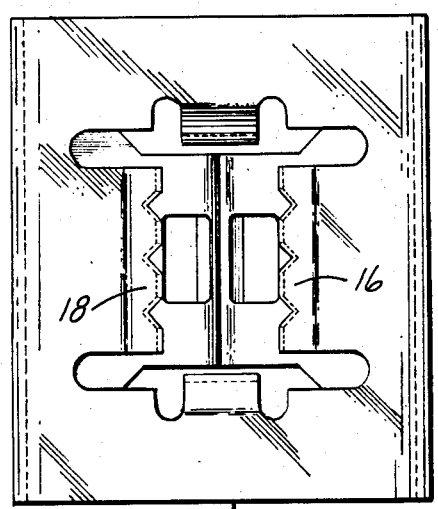
FIG. 3 is a top plan view of the molding clip of FIG. 1, enlarged to the scale of FIG. 2 for greater clarity.

Each edge of the side 20 and 22 slopes inwardly from the top 14 until it reaches the beginning of the clip's lower body portion 28. This lower body portion 28 is formed by the continuation of the side 20 and 22, with each of their edges parallel to the others, extending downwardly past the lowermost apex of the triangular cross-sectioned upper body portion 12 (i.e., extending downwardly past the point 30 at which one side 20 meets the other side 22 in abutting relationship) in substantially parallel relationship to one another and substantially perpendicular to the top 14 (see also FIG. 3).

Figure 4:
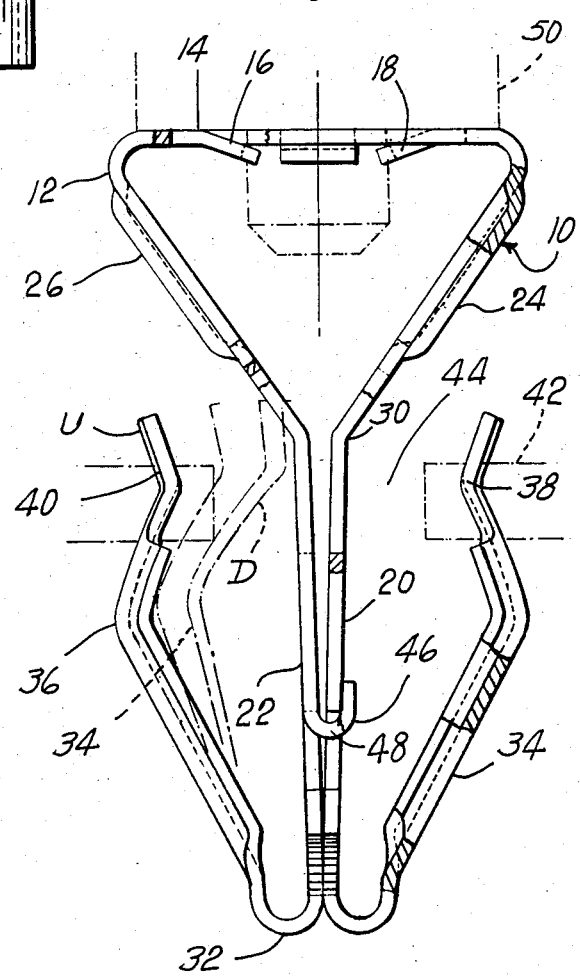
FIG. 4 is a side elevational view, taken on the same scale as FIGS. 2 and 3 and partially in sectional and phantom lines, showing the clip of FIGS. 1 through 3 bearing a decorative item and positioned in a base or support.

The further continuation of the sides 20 and 22 beyond the lower and 32 and the lower body portion 28 forms a pair of upwardly turning and outwardly facing flexing wings or legs 34 and 36, preferably of equal length, adapted at their upper ends 38 and 40 by means such as dog leg bends or in any other suitable fashion to prevent their upper ends 38 and 40 from passing completely through the base or support 42 (shown in phantom in FIG. 1) which receives the clip 10 through an aperture 44 (see also FIG. 4).

The portions of the sides 20 and 22 which form the lower body portion 28 can, if desired, be held together by a pair of locking tabs 46 and 48 (both shown in FIG. 2), or by any other suitable means, e.g., by adhesives, crimping or the like, to keep the sides 20 and 22, and thus the flexing wings or legs 34 and 36 from separating. Attachment of the sides 20 and 22 is advantageous in those applications wherein an element on the underside of the trim strip or other decorative item is inserted into the gap in the top 14. Should the element be of wide dimensional tolerance, an oversize element would tend to spread the side 20 and 22 and the flexing wings or legs 34 and 36 to an extent wherein entry into the aperture 44 would be inhibited, and could result in damage to the legs or the element. Attachment of the sides 20 and 22 results in alleviating this problem on assembly.

Figure 2:
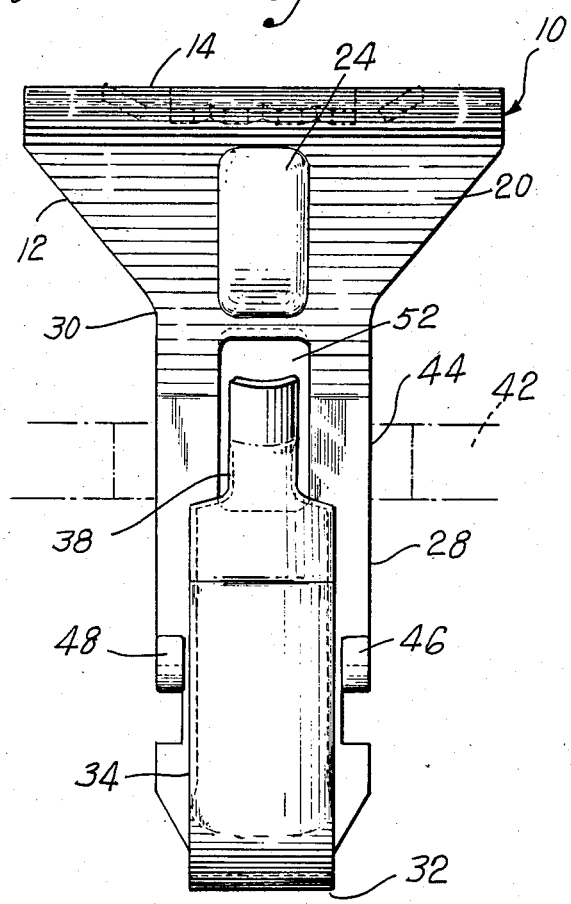
FIG. 2 is a side plan view of the molding clip of FIG. 1, further enlarged for greater clarity.

As shown in FIGS. 1 and 2, the sides 20 and 22 also contain cut-outs or slot holes 52 and 54, positioned partly in the upper body portion 12 and partly in the lower body portion 28, which admit the upper ends 38 and 40 of the flexing wings or legs 34 and 36 so as to permit entry of the wings or legs 34 and 36 and thus permit them to be compressed to facilitate assembly and disassembly of the decorative item-bearing clip 10 and the base or support 42.

Referring particularly to FIGS. 1 and 4, the molding clip 10 will, in use, engage the underside of a molding strip 30 (shown in phantom in FIG. 4) by means of the clips toothed tabs 16 and 18 contained in the top 14 of its upper body portion 12.

The molding strip 50 can be, for example, an elongated trim strip used to bridge the gap formed between a fixed window panel and an adjacent interior decorative panel in an automobile interior, and a plurality of molding clips 10 will be used to engage the strip 50 along its length.

A base or support panel 42, containing a plurality of apertures 44 along its length to receive the molding clips 10 will be positioned in the gap between the fixed window panel and the adjacent decorative panel. To assemble the strip onto the automobile interior, the molding clips 10, positioned along the underside of the strip 50 in alignment with the apertures 44 in the panel 42, are pushed into the apertures 44 to a position wherein only the top portion of the upper ends 38 and 40 of the flexing wings or legs 34 and 36 protrude above the surface of the panel 42.

In FIG. 4, the undistorted position of the flexing wing or leg 34 is designated by the letter "U", while the maximum distorted position of the flexing wing or leg 34, achieved while inserting the clip 10 into the panel 42 through aperture 44 (the upper ends 38 and 40 of the flexing wings or legs 34 and 36 having been compressed into the slot holes 52 and 54 in the sides 20 and 22 during this assembly operation; see FIG. 1) is also shown, and is designated by the letter "D". As can be seen, the flexing wings or legs 34 and 36 permit the strip 50 to be moved back and forth to properly position it, and by manually grasping the protruding portions of the upper ends 38 and 40 of the flexing wings or legs 34 and 36, the clips 10 can be disassembled, if necessary, from the panel 42.

It will be obvious to those skilled in the art that other changes and variations can be made in the present invention without departing from the spirit and scope thereof as defined in the appended claims.

We claim:

1. A resilient molding clip for retaining a decorative item in a bridging position over a gap between two spaced members, wherein said clip is received by an aperture in a base disposed within said gap, comprising (1) an upper body position having a planar top containing means adapted to engage and retain the underside of said decorative item; (2) a pair of downwardly and inwardly sloping sides connected to said top which, together with said top, give said upper body portion a triangular cross section; (3) a lower body portion formed by a continuation of said sides in substantially parallel relationship to one another and substantially perpendicular to said top, said lower body portion extending downwardly part the point at which said sides meet in abutting relationship; and (4) a pair of upwardly turning and outwardly facing flexing wings or legs connected to said lower body portion, said wings or legs being adapted to their upper ends to prevent said ends from passing completely through said aperture in said base, said sides each having a cut-out extending into said upper body portion and said lower body portion to permit entry of said upper ends of said flexing wings or legs, thus permitting said wings or legs to be compressed during assembly and disassembly of said clip and said base.

2. A resilient clip as set forth in claim 1 wherein said clip is a one-piece clip manufactured from spring steel.

3. A resilient molding clip as set forth in claim 2 wherein said planar top is rectangular and said means contained therein adapted to engage and retain the underside of said decorative item comprise a pair of facing toothed tabs.

4. A resilient molding clip as set forth in claim 2 wherein said wings or legs are of approximately equal length and are adapted at their upper ends to prevent said ends from passing completely through said aperture in said base by means of dog leg bends at their upper ends.

5. A resilient molding clip as set forth in any one of claims 2, 3, or 4 bearing a decorative item used to bridge a gap between two spaced members in an automobile interior.

6. A resilient molding clip as set forth in claim 1 wherein each said continuation of said sides is attached, one to the other.

7. A resilient clip as set forth in claim,, 6 wherein said each continuation of said sides is attached to the other by locking tab means disposed on said side continuation.

* * * * *